United States Patent [19]
Nakaoka

[11] Patent Number: 6,092,048
[45] Date of Patent: Jul. 18, 2000

[54] TASK EXECUTION SUPPORT SYSTEM

[75] Inventor: Masaki Nakaoka, Yokohama, Japan

[73] Assignee: Hitachi, Ltd., Tokyo, Japan

[21] Appl. No.: 08/963,765

[22] Filed: Nov. 4, 1997

[30] Foreign Application Priority Data

Nov. 8, 1996 [JP] Japan .................................. 8-296153

[51] Int. Cl.[7] .................................................. G06F 17/60
[52] U.S. Cl. .................................. 705/9; 705/8; 706/47; 706/925
[58] Field of Search ........................ 705/8, 9, 10; 706/47, 706/925

[56] References Cited

U.S. PATENT DOCUMENTS 5,301,320  4/1994  McAtee et al. .

FOREIGN PATENT DOCUMENTS 9416395  7/1994  WIPO .
9429804  12/1994  WIPO .

OTHER PUBLICATIONS

"Change Work by Workflow", in Nikkei Computer, 1996, Mar. 4 (No. 686), pp. 128–142.

*Primary Examiner*—James P. Trammell
*Assistant Examiner*—Mussie Tesfamariam
*Attorney, Agent, or Firm*—Antonelli, Terry, Stout & Kraus, LLP

[57] ABSTRACT

A task management server includes a memory unit for memorizing task information containing constituents indicated by a task property of a supported task, an action entry comprising a task, an event rule and a main task and subtask structure, and each of a plurality of client machines includes a task information display/operation unit which enables each user to operate information during a task is executed. A task execution support system supports the user such that the user can execute a task while determining the contents of action and the procedure of action in accordance with a progress of a task without defining a series of action procedure from the start to end of a task with all sorts of actions in the task listed-up as a network type flow before a task to be supported is started.

10 Claims, 15 Drawing Sheets

| TASK ID (2010) | TITLE (2020) | CHECK COMPLETION OF TASK (2030) | OBJECT (2040) | RESPONSIBLE-PERSON (2050) |
|---|---|---|---|---|
| TASK0001 (2110) | XX SHOW | NOT YET COMPLETED | BUSINESS TRIP | KITAGAWA TARO |
| TASK0002 (2120) | CREATE REPORT | NOT YET COMPLETED | REPORT | KITAGAWA TARO |
| TASK0003 (2130) | CLASSIFYING OF CATALOGS | COMPLETED | CATALOG | KITAGAWA TARO |
| TASK0004 (2140) | CREATE SPECIFICATION | NOT YET COMPLETED | XX SPECIFICATION | KITAGAWA TARO |

| MAIN TASK ID (3010) | SUBTASK ID (3020) |
|---|---|
| TASK0001 (3110) | TASK0002 |
| TASK0001 (3120) | TASK0003 |
| TASK0004 (3130) | TASK0005 |
| TASK0004 (3140) | TASK0006 |

| | TASK ID 4010 | PROPERTY ID 4020 | TITLE OF PROPERTY 4030 | PROPERTY VALUE 4040 |
|---|---|---|---|---|
| 4110 | TASK0001 | PROP0001 | REPORT FILE | G:\\FileSrv\Report··· |
| 4120 | TASK0001 | PROP0002 | DEADLINE | 1997/05/20 |
| 4130 | TASK0001 | PROP0003 | START DAY | 1996/06/06 |
| 4140 | TASK0001 | PROP0004 | MODEL FILE | G:\\FileSrv\Templa··· |

| | TASK ID 5010 | ACTION ID 5020 | TITLE OF ACTION 5030 | NAME OF WORKER 5040 | STATE OF EXECUTION 5050 |
|---|---|---|---|---|---|
| 5110 | TASK0001 | ACTI0001 | LIST UP SHOW BOOTH | KITAGAWA TARO | NOT YET EXECUTED |
| 5120 | TASK0001 | ACTI0002 | WRITE TEXT | KITAGAWA TARO | STILL EXECUTING |
| 5130 | TASK0001 | ACTI0003 | WRITE CONCLUSION | KITAGAWA TARO | ALREADY EXECUTED |
| 5140 | TASK0001 | ACTI0004 | PROOFREAD | KITAGAWA TARO | NOT YET EXECUTED |

| | TASK ID | RULE ID | EVENT CONDITION ID | TITLE OF TASK CONDITION UNIT | TITLE OF EXECUTION UNIT |
|---|---|---|---|---|---|
| 6110 | TASK0001 | RULE0001 | EVE000 | cond-A | cmds-A |
| 6120 | TASK0001 | RULE0002 | EVE001 | cond-B | cmds-B |
| 6130 | TASK0001 | RULE0003 | EVE002 | cond-C | cmds-C |
| 6140 | TASK0001 | RULE0004 | EVE003 | cond-D | cmds-D |

| | EVENT CONDITION ID | EVENT TYPE | TARGET TASK ID | TITLE OF TARGET OBJECT |
|---|---|---|---|---|
| 7110 | EVE000 | TSKCOMPL | TASK0001 | – |
| 7120 | EVE001 | ACTSTART | TASK0002 | WRITE TEXT |
| 7130 | EVE002 | PRPCHANG | TASK0001 | DEADLINE |
| 7140 | EVE003 | SBTSKCRT | TASK0001 | CLEAR TRAVELING EXPENSES |

| EVENT TYPE | MEANING |
|---|---|
| TSKCOMPL | TASK COMPLETED |
| ACTSTART | ACTION STARTED |
| ACTFINIS | ACTION FINISHED |
| PRPCHANG | PROPERTY CHANGED |
| CHRCHANG | CHANGE RESPONSIBLE-PERSON |
| SBTSKCRT | CREATE SUBTASK |
| SBTSKCMP | COMPLETE SUBTASK |

9010 — Cond-A
{ (TRAVELING EXPENSES > 0 AND
9020 — TRAVELING EXPENSES LIQUIDATION!= "COMPLETED") OR
REPORT FILE == "" }

9030 — Cond-B
9040 — { TRAVELING EXPENSES > 5000 }

9050 — Cond-C
{ TRAVELING EXPENSES > 25000 AND
9060 — TYPE OF BUSINESS TRIP == " OVERSEAS " }

FIG. 10

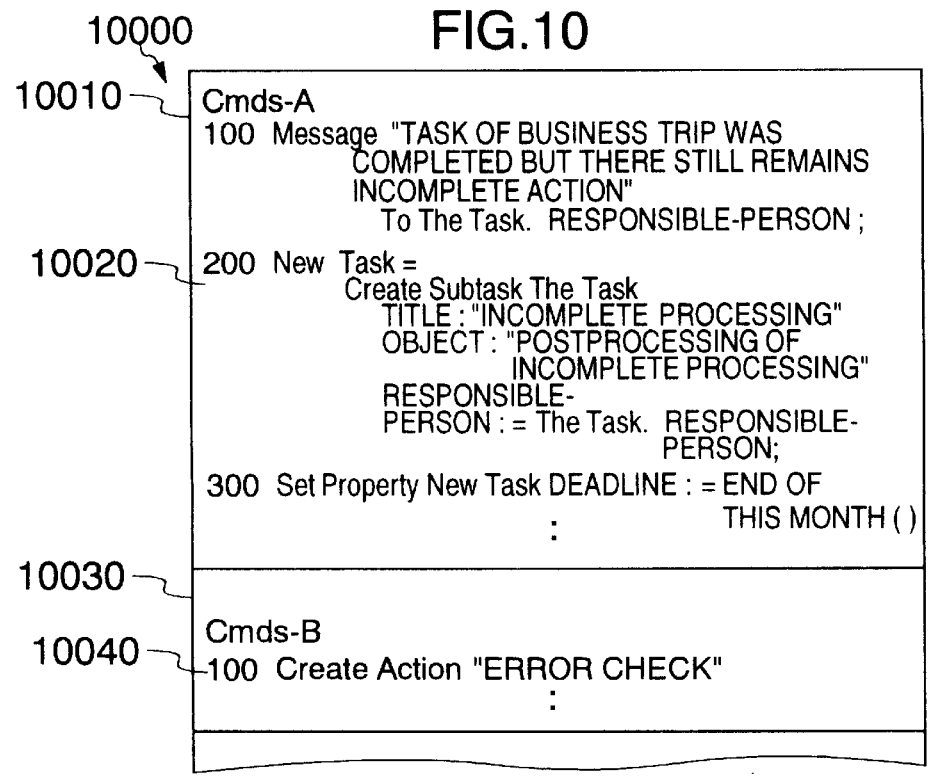

```
10000
10010 ── Cmds-A
         100 Message "TASK OF BUSINESS TRIP WAS
                     COMPLETED BUT THERE STILL REMAINS
                     INCOMPLETE ACTION"
                  To The Task. RESPONSIBLE-PERSON ;
10020 ── 200 New Task =
                  Create Subtask The Task
                     TITLE : "INCOMPLETE PROCESSING"
                     OBJECT : "POSTPROCESSING OF
                               INCOMPLETE PROCESSING"
                     RESPONSIBLE-
                       PERSON : = The Task. RESPONSIBLE-
                                                PERSON;
         300 Set Property New Task DEADLINE : = END OF
                                :               THIS MONTH ( )
10030 ──
10040 ── Cmds-B
         100 Create Action "ERROR CHECK"
                                :
```

FIG. 12A        FIG. 12B

     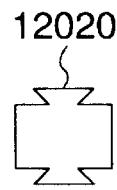

```
13000
         13010    13020  13040           13030
        ┌─────────────────────────────────────────────┐
        │ CREATE NEW TASK                             │
        │                                             │
        │ TITLE OF TASK: [   |   ]  RESPONSIBLE-      │
        │                           PERSON :  (NOT ENTERED) │
        │                                             │
        │ OBJECT OF TASK: [ (NOT ENTERED)          ]  │
        │                                             │
        │ TITLE OF MAIN TASK: [ (NULL) ] ─ 13050      │
        │                                   ┌───────┐ │
        │                          13060 ──│ CREATE│ │
        │                                   └───────┘ │
        └─────────────────────────────────────────────┘
```

FIG.18

CREATE ACTION | TITLE OF TASK : CREATE REPORT

TITLE OF ACTION: [          ]

USER: [(NOT YET ENTERED)]

(CREATE PROPERTY)

FIG.19

EXECUTED ACTION | TITLE OF TASK : CREATE REPORT

| TITLE OF ACTION | EXECUTION STATE | OPERATION |
|---|---|---|
| CHECK DETAILS OF EXHIBITS OF XX COMPANY | STILL EXECUTING | (END ACTION) |
| WRITE TEXT | STILL EXECUTING | (END ACTION) |
| WRITE COMMENT AND CONCLUSION | ALREADY EXECUTED | |
| WRITE TEXT | ALREADY EXECUTED | |
| CREATE LIST OF SHOW BOOTH | ALREADY | |

FIG.20

| EVENT CONDITION | | | TITLE OF CONDI-TION UNIT | TITLE OF EXECU-TION UNIT | CHANGE |
|---|---|---|---|---|---|
| CREATE REPORT | — | WHEN ITS TASK IS COMPLETED | Cond-A | Cmds-A | CHANGE |
| CREATE REPORT | WRITE TEXT | WHEN ITS ACTION IS FINISHED | Cond-B | Cmds-B | CHANGE |
| CREATE REPORT | DEADLINE | WHEN ITS PROP-ERTY IS CHANGED | Cond-C | Cmds-C | CHANGE |
| CREATE REPORT | CLEAR TRAVELING | WHEN ITS SUBTASK IS CREATED | Cond-D | Cmds-D | CHANGE |

LIST OF EVENT RULE — CREATE NEW RULE

TITLE OF TASK : CREATE REPORT

FIG.21

CREATE/CORRECT EVENT RULE

TITLE OF TASK : CREATE REPORT

EVENT CONDITION

CREATE REPORT : WRITE TEXT  WHEN ITS AC-TION IS FINISHED

UPDATE

TASK CONDITION UNIT
TITLE OF CONDITION UNIT: Cond-B

```
{
 TRAVELING EXPENSES > 5000
}
```

EXECUTION UNIT
TITLE OF EXECUTION UNIT: Cmds-B

```
{
CreateAction
 "ERROR CHECK"
 RESPONSIBLE-
      PERSON:="KAMIIKE
           TSUYOSHI"
 Message
```

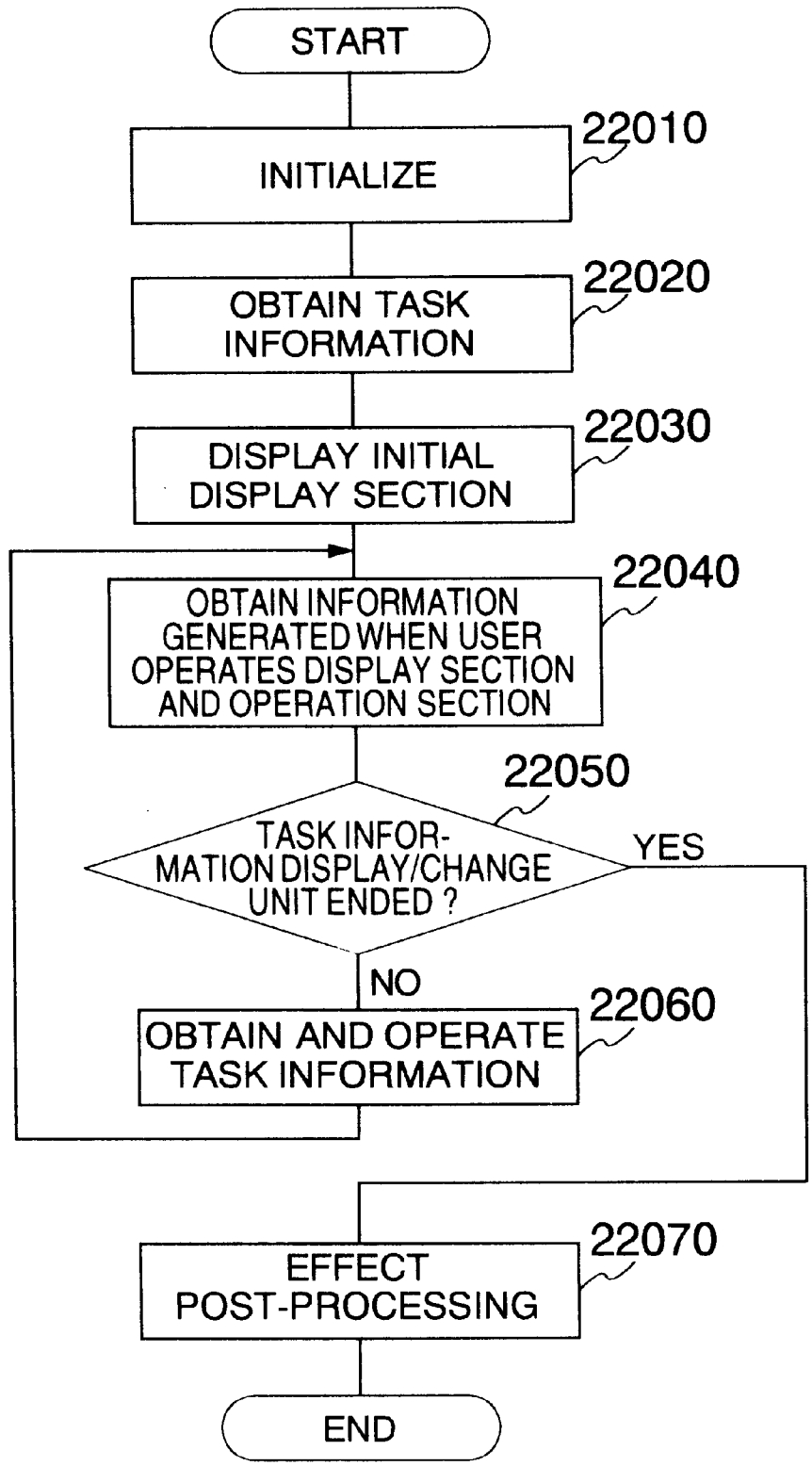

TASK EXECUTION SUPPORT SYSTEM

BACKGROUND OF THE INVENTION

The present invention relates to a task execution support system which can efficiently support the execution of a task by using a computer when more than one user (preferably a plurality of users) execute at least one task.

As a task support system, there has hitherto been known a workflow system. The workflow system is to previously register a task property indicative of task processing object information common to works done by each user in order to execute a task or which is information inherent in each task and a work and a work procedure from the start to the end of the task as task definitions before the user starts the task. The workflow system is an information processing system which supports the following task execution by registering a task definition designated by information indicative of the task from a task entry corresponding to a started task in a one-to-one relation when the task is started in actual practice.

Specifically, to each user, there is displayed a task entry list having works that should be executed by the user from tasks that the workflow system should support. Therefore, the user can avoid such an accident that the user forgets the user's own work. Also, the user can confirm the number of works that have been piled up so far at this time. Moreover, when the user selects a work from the work list, information necessary for the work determined by the task definition is presented to the user, thereby improving the efficiency of the corresponding work.

Moreover, since the task is electronically managed by the above-mentioned framework, a task administrator who periodically confirms the progress of the task need not inquire of each user about the confirmation of the progress of the task. That is, the task administrator can confirm the progress of the task by checking how far the desired task makes a progress on the work procedure of the workflow system or by examining a value of a task property of the task.

The outline of the workflow system is described in "NIKKEI COMPUTER" (published by NIKKEI BUSINESS PUBLICATIONS INC.), 1996, March 4 (No. 686) featuring "CHANGE WORK BY WORKFLOW", pp. 128–142.

The workflow system has a task whose property and work procedure can be determined previously as a target of the task support. Therefore, before the task which becomes the target of the task support is started, it was possible to register the definition of the task including a complete work procedure ranging from the start of the task to the completion of the task.

However, of the tasks, there is a task having a form in which future task property and work procedure are determined based on the results of the work after a part of work on the task was executed since the task has been started. In particular, as a typical example of such task, there is known such a task in which the work contents and the work procedure following the work are planned as one of works in the task.

In the case of such task, since all work procedures are not yet decided at the time the task is started, the task definition of the workflow system cannot be expressed, and hence such task cannot receive the task support at all.

Moreover, the workflow system has a second problem which will be described below. The workflow system assumes a practical use such that users properly execute their tasks without discriminating their own works from respective tasks of necessary task groups. Accordingly, the user interface for selecting a task of works from the task groups displays a task list on which tasks of works to be executed by the user are roughly selected, and it is sufficient for the user to properly select the task from the task list.

However, some of tasks to be supported by the task execution support system may have works which have to be executed depending upon the situation of the task relating to other users even though they are not previously determined such that they should be executed. Accordingly, it is frequently observed that the user executes the work, which is not previously registered, even though the work that the user has to execute is the task which is not registered on the task list. The user who will execute such work has to monitor the task other than relating tasks judged from the registered works.

However, when the number of tasks to be handled by the task execution support system increases, it is not efficient for each user to monitor the whole of the task. Moreover, a certain user has to search a task in which user's own work is not registered in advance but the user has to execute such work thereafter from the task entry managed by the task execution support system.

On the task list of the workflow system, there are displayed information such as a task definition and a starting day at every task entry. Therefore, if necessary, the user can see information on the displayed task list and select a necessary task. However, in general, it is not always possible for the user to effectively narrow the scope of the tasks based on the characteristics of the tasks such as the task definition and the starting day. Moreover, even though the tasks are characterized by such information, it is cumbersome for the user to search a task having predetermined characteristics from the task list when the number of tasks increases.

To obviate this drawback, it is considered that the task is searched based on the task property of each task. It is not always possible that task properties that can be used by the user to narrow a scope of tasks until the user finds out a desired task are set. Furthermore, even when there exist such task properties, it is very cumbersome for the user to understand the meanings of these task properties and to express effective search conditions which enable the user to search a desired task.

SUMMARY OF THE INVENTION

An object of the present invention is to provide a task execution support system in which, even when all work procedures are not yet decided at the time a task is started, a task support can be executed in accordance with a partly-decided work procedure and the work procedure decided after the task was started.

Another object of the present invention is to provide a task execution support system in which a user can effectively search and select a necessary task entry without registering works in the task in advance.

In order to attain the first object of the present invention, the present invention may be arranged as follows:

A task execution support system for supporting the execution of a task composed of a plurality of works executed by a plurality of workers comprises memory means for memorizing tasks with contents of respective works of respective workers associated with each other and task information management means for changing a work of related other worker in response to the input of changed contents and memorized contents of the memory when the contents of a work are changed.

Further, the task execution support system comprises memory means for memorizing a task entry expressing a task having system information such as a task title and a task object, a task property expressing information inherent in a task used in executing the task as information at every task entry, an information work entry expressing a work executed in a task having information of a worker and a work content, a work procedure of the task and an execution plan of a task, an addition of a work that should be executed newly, and a change of a task property or a task entry that should be executed automatically when the designated work is started/ ended, property information of the designated work is changed, the designated task is created/completed and a certain task condition expressed by the task property is satisfied, and an event rule expressed by deciding the operation of the work entry, means for automatically operating task information described in the event rule when conditions described by the event rule registered on each task entry are satisfied, means for displaying a task list with information such as a title and an object of each task as additional information based on the information memorized in the memory unit, means for displaying a list of work entries of the task entry selected from the information memorized in the memory unit when a task is selected by the user, means for creating a task entry by the user when there occurs a new task, means for entering an object of a task corresponding to the task entry in response to the created task entry, means for placing the corresponding task entry in the task completion state when the task is completed, means for creating/changing a task property on the task entry, means for registering a new work entry with respect to the selected task, means for placing the work entry in the work starting state, means for placing the work entry in the work end state when a work corresponding to the work entry is ended and means for entering an event rule expressing a work procedure when a new work procedure is decided.

According to the above-mentioned arrangement, the user who is the beginner of the task can create a task entry and can create the work entry expressing the work decided at that time and the event rule expressing the work procedure for the task in which all of the works and the work procedures are not decided before the task is started. At that time, it is not necessary to register all of future works which will be executed in this task. Moreover, it is not necessary to describe a series of work procedures from the start to the end of the task. If each user searches not only those who define the task in the workflow system but also the created work, then each user can obtain a list of work that the user should execute similarly to the workflow system. Furthermore, if each user set as one of task characters searches a task character property of each task entry, then each user can easily obtain a list of tasks and works that the user should manage. Therefore, the user can manage the progress of the task, can execute the work which is not yet scheduled and can decide the work procedure.

A specific example thereof will be described below. In this case, let us consider the following task in which a main writer, a sub-writer and a plurality of assistants create a document in collaboration with each other by request of a client. However, the client instructs only a rough content and the main writer decides a composition of chapters of such document, etc. Also, the specific writing of those chapters is carried out by the main writer or the sub-writer. The assistants are adapted to proofread or make a fair copy of the chapters at every chapter written by the main writer or the sub-writer. The main writer decides the composition of the chapters, and decides chapters that the sub-writer should write. However, the composition of the chapters is not decided at the beginning, and there is then the possibility that some changes such as an increase of new chapters will occur as the writing of the document proceeds. At that time, if a work in which a document creation task is started and the main writer decides the composition of chapters is not executed, then it cannot be determined which of the main writer or the sub-writer makes drafts of respective chapters. Furthermore, it cannot be determined which assistant proofreads or makes a fair copy of which chapter. In such a case, at the time the client requests a document, all work procedures from the request of the writing to the completion of the writing are not decided. As a result, the task execution support cannot be executed by the conventional workflow system.

According to the task execution support system of the present invention, at the time a creation of a document is decided, the client creates a task entry which expresses a document creation task. When the task entry is created, the client sets a task title which enables the task to be distinguished with ease, an explanation of an object of a task which cannot be described by the title and a task execution responsible person of the task. Here, let it be assumed that the task title is "CREATE REPORT OF INVESTIGATION OF PC MARKET" and the task object is "ARRANGE DATA OF INVESTIGATION OF PC MARKET AND CREATE REPORT". Also, the task client sets information decided when the client sets a property "CONTENT" expressing a rough content of a document requested for writing as a task property and also sets information such as a property "DEADLINE" determined when the writing is requested as a property of this task entry. Thus, there can be decided a framework of task processing target information commonly used among respective works of the task and which are information peculiar to each task.

When the client creates the task entry "CREATE REPORT OF INVESTIGATION OF PC MARKET" and sets the above-mentioned items, it becomes possible for the main writer to find out the task created by the client from the task list without previously determining the work and the work procedure information in particular. The main writer can grasp the task contents expressed by the task entry by checking the task title and the task object. Moreover, the main writer can obtain a variety of information concerning the task by confirming the task properties such as the "CONTENT" property and "DEADLINE" property set as the properties of the task entry. The main writer may consider the compositions of chapters concerning the requested document based on these information and may create the task entries expressing the writing of respective chapters based on the composition of the chapters. Then, for each of the task entries, the main writer may plan the writing work of each chapter and the following works. The main writer or the sub-writer may register the work entries on the corresponding task entry based on that plan. Further, the main writer or the sub-writer may register the work procedure in which the assistants execute the proofreading/ making of a fair copy after each writing work as an event rule. Thus, even though a series of work procedures from the start to the completion of the task is not fully decided before the task is started, the user can receive a task support service.

Furthermore, the present invention has the following characteristics.

Specifically, the task execution support system according to the present invention comprises means for memorizing a task execution responsible person who is in charge of the execution of the task for each task entry, means for displaying only the task in which the person in charge is the task execution responsible person as a task list when the task list is displayed to the user, means for inputting the task execution responsible person who is in charge of the execution of the task when the task entry is created, means for changing the task execution responsible person when the task execution responsible person is changed, means for memorizing tree structure information in which a task entry expressing a main task and subtask relationship between the tasks in which an object of the subtask becomes an intermediate object of the main task, means for displaying the task list together with the tree structure information, means for selecting at every particular task whether or not the subtask of the task is displayed on the task list, and means for creating a task entry expressing a secondary task as a subtask in which a task entry expressing the original task as a main task when a secondary task having an intermediate object of the task as a final object is registered.

The task execution support system according to the present invention has the above-mentioned characteristics. There is a case users who have a possibility to execute a work which is not set on the task specific actions of which cannot be registered because a particular work for achieving the task is not decided previously. In such a case, if those users are set as task responsible persons of the task, then the user who is the task responsible person can obtain the task list in which the user is the task responsible person.

In the case of the aforementioned example, since the client cannot concretely decide the work of the main writer after the client created the task entry of "CREATE REPORT OF INVESTIGATION OF PC MARKET", such a work cannot be registered. In this case, if the number of the task entries handled by the task execution support system increases, then the main writer has to monitor all of the task entries and find out the task entry of "CREATE REPORT OF INVESTIGATION OF PC MARKET" from all of the task entries as a task that should be processed by the main writer. Alternatively, the client has to inform the main writer that the task entry is created separately. According to the present invention, when the client registers the task entry of "CREATE REPORT OF INVESTIGATION OF PC MARKET", the task execution responsible person is set to the main writer. Then, the main writer can easily discover the task entry "CREATE REPORT OF INVESTIGATION OF PC MARKET" by monitoring the task list in which the main writer is set to the task execution responsible person. Thus, the main writer can execute the following works that should be executed by the main writer.

Also, when the user executes a work concerning a particular task although the user is not set as the task execution responsible person or the worker of the work, respective tasks are of the main task and subtask structure using the object as a key. Therefore, it is possible for the user to search such particular task by sequentially searching the main task and subtask relationship based on the object information of each task from the known task entry which is likely to be related to that task. Unlike the manner in which the task is classified based on the task definition, according to the method of classifying the task based on the object information, even when the number of tasks increases, the number of high-order tasks on the main task and subtask structure of the task based on the object increases accordingly. Thus, it can be expected that the number of the subtasks positioned at the low-order of one main task does not increase so much. In this case, under the condition that any task is selected, the user can select a promising task from the subtask list. Therefore, by properly selecting the subtasks relating to the target task and further by repeatedly selecting the subtasks relating to the subtask groups of the subtask, the user can find out the corresponding task.

This will be described with reference to the aforementioned example. When the client intends to confirm the progress of each chapter by searching how far the writing task of each chapter of the task of "CREATE REPORT OF INVESTIGATION OF PC MARKET" has been completed, the client has to select the writing task entry of each chapter by any method. However, the client does not always understand the composition of the chapter which is set at present. Therefore, when there are many task entries that should be handled by the task execution support system, it is very difficult for the client to correctly select every one of these task entries.

According to the present invention, when the client creates new task entries in order to write respective chapters, these task entries are registered as subtasks of the task of "CREATE REPORT OF INVESTIGATION OF PC MARKET". Therefore, the client can achieve the object by searching the subtasks of the task of "CREATE REPORT OF INVESTIGATION OF PC MARKET". At that time, it is not necessary for the client to search the whole of the task entries managed by the task execution support system.

According to the present invention, unlike the conventional workflow system in which the work and the work procedure are defined by the network-type flow, the work and the work procedure are expressed by the work entry expressing the work and the event rule expressing the work procedure so that even the work of which the work procedure is not decided can be made as a target of the task execution support. Further, since each user can define task information including a work procedure for the task execution support if necessary, even though all work procedures are not decided at the time the task is started, it becomes possible to execute the task execution support in accordance with a partly-decided work procedure and work procedures that have been sequentially entered after the task was started.

Furthermore, according to the present invention, when a task is created, the task can be hierarchized by the main task and subtask structure based on an object among the tasks. Also, when a task is searched, it is possible to search a necessary task by tracing the main task and subtask structure. Furthermore, task execution character information can be managed at every task, whereby the tasks can be narrowed down to necessary tasks and then displayed. Therefore, even when the works in the task are not necessarily registered, the user can effectively search and select the necessary task entry.

BRIEF DESCRIPTION OF THE DRAWINGS

FIG. 2 is a diagram showing a task entry table;

FIG. 3 is a diagram showing a task tree structure table;

FIG. 4 is a diagram showing a task property table;

FIG. 5 is a diagram showing an action entry table;

FIG. 6 is a diagram showing an event rule table;

FIG. 7 is a diagram showing an event condition table;

FIG. 8 is a diagram showing an event code list;

FIG. 9 is a diagram showing a task condition unit module;

FIG. 10 is a diagram showing an execution unit module;

FIGS. 12A and 12B are diagrams showing task icons, respectively;

FIG. 13 is a diagram showing a new task creation operation section;

FIG. 18 is a diagram showing an action creation operation section;

FIG. 19 is a diagram showing an execution action list display section;

FIG. 20 is a diagram showing an even rule list display section;

FIG. 21 is a diagram showing an event rule creation/correction operation section;

FIG. 22 is a flowchart showing a flow of a processing executed by a task information display/operation unit;

DESCRIPTION OF THE PREFERRED EMBODIMENT

A task execution support system according to an embodiment of the present invention will hereinafter be described with reference to the drawings.

Figure 1:
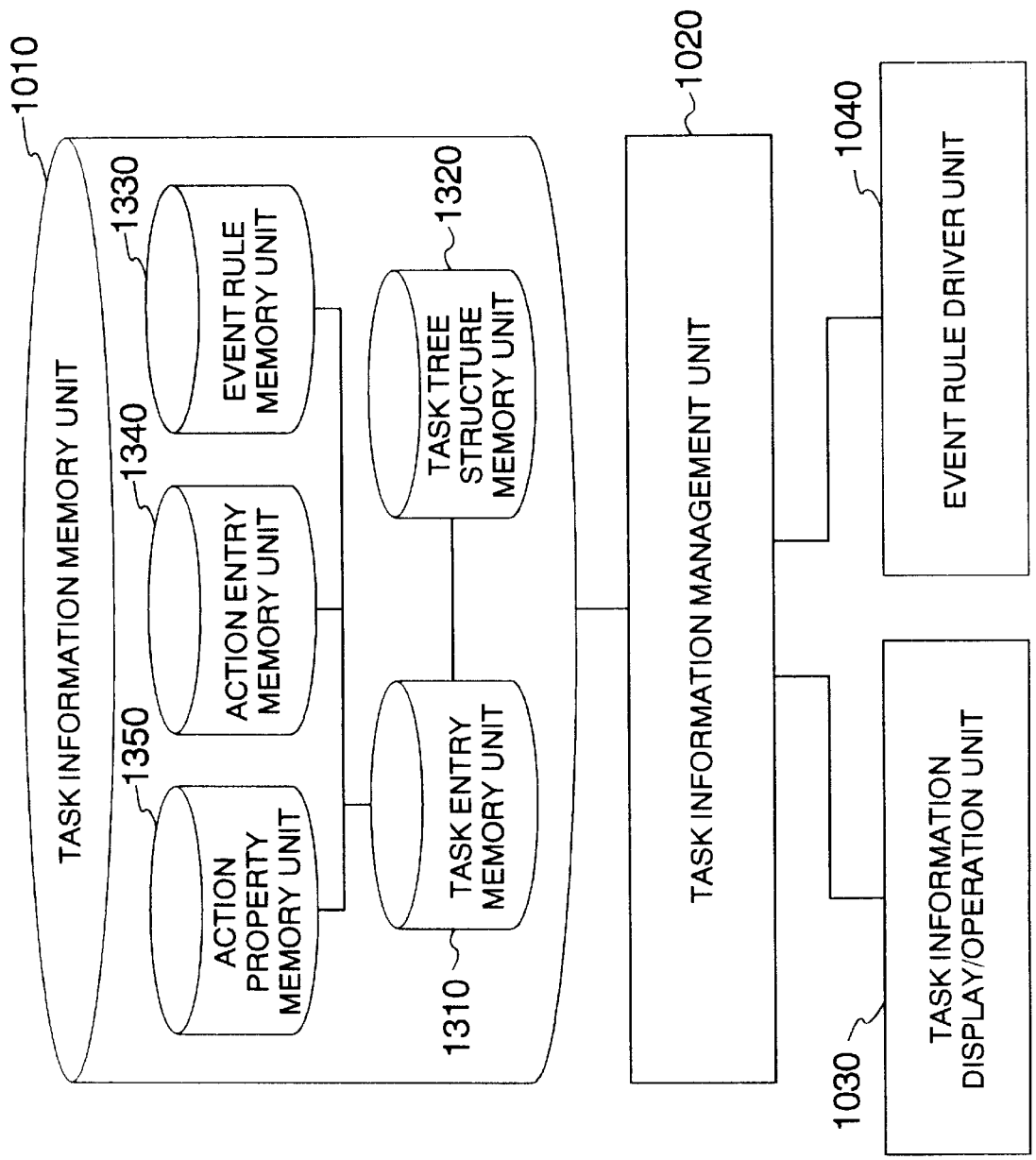
FIG. 1 is a functional block diagram of a task execution support system according to the present invention.

FIG. 1 is a functional block diagram showing a task execution support system according to this embodiment. As shown in FIG. 1, this task execution support system includes a task information memory unit 1010, a task information management unit 1020, a task information display/operation unit 1030 and an event rule driver unit 1040.

The task information memory unit 1010 comprises the following units: A task entry memory unit 1310 is to memorize task entry information indicative of a task in response to the task which is a framework made in order to attain a certain object by the action of one or a plurality of users. A task tree structure memory unit 1320 is to memorize task tree structure information indicative of a set structure obtained by objects among the tasks. An action entry memory unit 1340 is to memorize at every task entry an action entry indicating an action done by a task and which has information such as workers and contents of action. A task property memory unit 1350 is to memorize at every task entry a task property indicative of information inherent in the task used when the task is executed. An event rule memory unit 1330 is to memorize information obtained when a designated action is ended, designated task property information is changed, a designated task is generated or a designated task is completed. Also, the event rule memory unit 1330 is to memorize at every task entry the addition of a new action and the change of task property when a certain task condition expressed by a task property is satisfied or a task entry operation which should be executed automatically or an event rule which is expressed by determining an action entry operation. Incidentally, task entry information, task tree structure information, action entry information, task property information and event rule information will be described later on more in detail. Also, information concerning a task memorized in the task information memory unit will be referred to as action information.

The task information management unit 1020 is adapted to read task information from the task information memory unit 1010 and to change memorized task information in accordance with a task information reference/operation request issued from the task information display/operation unit 1030 or the event rule driver unit 1040. Moreover, the task information management unit 1020 is adapted to supply information concerning operation to the event rule driver unit 1040 when task information is operated. The task information display/operation unit 1030 obtains task information from the task information management unit 1020 and displays information concerning the task to the worker. Moreover, the task information display/operation unit 1030 changes an information display concerning a task in response to a display operation executed by the worker. Furthermore, the task information display/operation unit 1030 provides a user interface to enable the worker to operate task information, allows the worker to operate task information through the user interface and operates the task information obtained in accordance with such operation through the task information management unit 1020.

The event rule driver unit 1040 automatically operates task information in accordance with an event rule of task information by using an event generated by the task information management unit 1020 as a key. In that case, the event rule driver unit 1040 starts the execution of event rule itself. Then, the event rule driver unit 1040 receives information necessary for interpreting the event rule from the task information management unit 1020. Furthermore, the event rule driver unit 1040 operates automatic execution task information through the task information management unit 1020.

Figure 25:
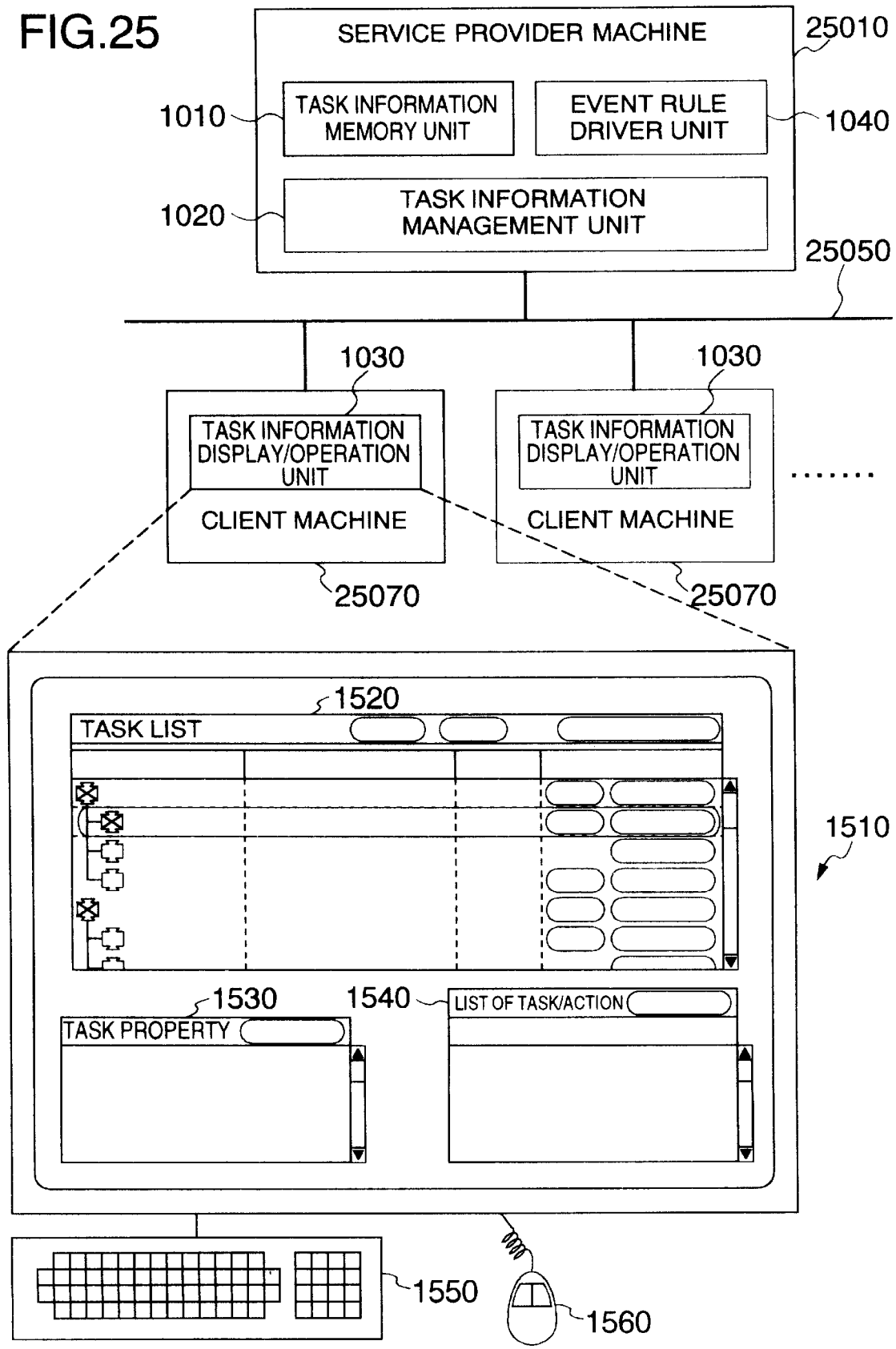
FIG. 25 is a diagram showing a hardware according to the present invention.

FIG. 25 is a diagram showing the hardware according to the embodiment of the present invention. As shown in FIG. 25, a service provider machine 25010 includes the task information memory unit 1010, the event rule driver unit 1040 and the task information management unit 1020. The service provider machine 25010 provides information concerning task information, and processes the operation of the task information. Each of the client machines 25070 includes the task display/operation unit 1030, displays the task information to the user, and provides a user interface which enables the user to operate the task information. A network 25050 enables the client machine 25070 and the service provider machine 25010 to exchange information therebetween.

An information display unit 1510 in the task information display/operation unit 1030 provides a user interface which enables task information to be displayed and operated, and includes the following elements: The information display unit 1510 includes a task list display section 1520 for displaying registered tasks in the form of a list and which provides a user interface of an operation concerning a task entry, a task property display section 1530 for providing a user interface of the operation concerning a task property and a task action display section 1540 for displaying a task action of a selected task and which provides a user interface of the operation concerning a task property. Also, the task information display/operation unit 1030 includes a keyboard 1550 for enabling the user to enter data and a mouse 1560 for enabling the user to move or operate a cursor.

FIG. 2 shows a structure and contents of a task entry table 2000 stored in the task entry memory unit 1340. Records 2110 to 2140 of the task entry table 2000 correspond to task entries, respectively, and express information of the corresponding task entries. In the task entry table 2000 of FIG. 2, fields 2010 to 2050 represent structures of information of the task entries. That is, the field 2010 represents a task ID (identification) which specifies only one task entry. The field 2020 represents a title of a task expressed by a task entry. The field 2030 represents whether or not the task is completed. The field 2040 represents a character string which is used to explain an object of a task expressed by the task entry. The field 2050 represents a person (hereinafter referred to as character) who is in charge of the task expressed by the task entry.

The records 2110 to 2140 show examples of task entries.

The record 2110, for example, shows such task entry that the task ID is "TASK0001", the task title is "XX show", the task is not completed, the task object is "GO TO SHOW ON BUSINESS" and that the responsible person (who is in charge of the task) of the task is "KITAGAWA TARO".

FIG. 3 shows a task tree structure table 3000 stored in the task tree structure memory unit 1320 and examples of contents thereof. Each of records 3110 to 3140 of the task tree structure table 3000 corresponds to a set of task main task and subtask relationship. In the task tree structure table 3000 shown in FIG. 3, the fields 3010 and 3020 represent information structures of a pair of main and subtask relationships. Specifically, the field 3010 shows a task entry ID (identification) of the main task in the main task and subtask relationship. Also, the field 3020 shows a task entry ID of the subtask in the main task and subtask relationship.

Records 3110 to 3140 show the examples of the master task and subtask relationships. The record 3110, for example, shows such a main task and subtask relationship that a task expressed by a task ID "TASK0001" is the main task and a task expressed by a task ID "TASK0002" is the subtask. As is clear from FIG. 3, the same main task can achieve the main task and subtask relationship between it and different subtasks.

FIG. 4 shows a task property table 4000 stored in the task property memory unit 1350 and the examples of the contents thereof. Each of records 4110 to 4140 of the task property table 4000 corresponds to one property of a certain task entry. In the task property table 4000 shown in FIG. 4, fields 4010 to 4040 represent information structures of the task properties. Specifically, the field 4010 shows a task ID of a task to which the property belongs. The field 4020 shows a property ID which is uniquely determined at every ID of the task to which the property belongs. The field 4030 shows a title of the property, and the field 4040 shows a value of the property.

The records 4110 to 4140 show examples of properties. The record 4110, for example, shows that the task property is a property belonging to the task whose task ID is "TASK0001", the property ID is "PROP0001", the property title is "REPORT FILE" and that the property value is "G:\\FileSrv\Report\XX-show.DOC".

FIG. 5 shows an action entry table 5000 stored in the action entry memory unit 1340 and examples of contents thereof. Each of records 5110 to 5140 of the action entry table 5000 corresponds to one action of a certain task entry. In the action entry table 5000 shown in FIG. 5, fields 5010 to 5050 represent information structures of the action entries. Specifically, the field 5010 represents the task ID of the task to which the action entry belongs. The field 5020 represents the action ID which is uniquely determined at every action entry in the task to which the action entry belongs. The field 5030 represents the action title which indicates the contents of the action. The field 5040 represents the worker which shows the user to execute the action. The field 5050 represents the status of the action, i.e. whether or not the action is executed or whether or not the action was already executed.

The records 5110 to 5140 show examples of action entries. The record 5110, for example, shows the action entry belonging to the task of which the task ID is "TASK0001", that the action ID is "ACT10001" and the action is "to list up display booth". Further, the record 5110 shows that the action that should be executed by "KITAGAWA TARO" is not yet executed.

FIGS. 6, 7, 9 and 10 show an event rule table 6000, an event condition table 7000, a task condition unit module 9000 and an execution unit module 10000 stored in the event rule memory unit 1330 and examples of contents thereof, respectively. In the event rule table 6000 shown in FIG. 6, each of records 6110 to 6140 corresponds to an event rule registered on a certain task. Also, each of the fields 6010 to 6050 represents an information structure of the event rule. Specifically, the field 6010 shows a task ID to which the event rule belongs. The field 6020 shows an event rule ID which is uniquely determined at every event rule in the task to which the event rule belongs. The field 6030 shows an event condition ID which specifies event condition information memorized in the event condition table 7000. The field 6040 shows a task condition unit title which specifies task condition unit information memorized in the task condition unit module 9000. The field 6050 shows an execution unit title which specifies execution unit information memorized in the execution unit module 10000.

FIG. 7 shows the event condition table 7000. Each of records 7110 to 7140 of the event condition table 7000 corresponds to one event condition used in the event rule. Also, fields 7010 to 7040 represent information structures of the event conditions. A task entry, an action entry and a task property will hereinafter be generally referred to as "task object". Moreover, to operate "task object" means "to start or complete action", "to change task property information" or "to generate or complete a specific subtask when a certain task is completed or under a certain task" or "to change a responsible person of task".

One event condition shows a specific operation time expressed by using information of operation of a certain task object. Specifically, the field 7010 shows an event condition ID which uniquely determines the event condition. The field 7020 shows a code indicative of type of task object operation which represents the time that the event condition wants to indicate. The field 7030 shows a task ID to which there belongs an operation target task object of a task object operation expressing the time that the event condition wants to indicate. The field 7040 shows a title of an operation target task object of a task object operation which expresses the time that the event condition wants to indicate. However, when the task object operation indicates the completion of the task, the field 7030 shows the task object which is to be completed, and the field 7040 is not significant.

FIG. 8 shows a list 8000 of types of task object operations used in the field 7020. FIG. 9 shows the structures of the task condition unit module 9000 and the examples thereof. In the task condition unit module 9000, a task condition unit 9010 is expressed by a task condition unit title "Cond-A", and condition contents indicated by this task condition unit title "Cond-A" is expressed by a conditional expression 9020. Similarly, a task condition unit 9030 is expressed by a task condition unit title "Cond-B", and condition contents indicated by this task condition unit title "Cond-B" is expressed by a conditional expression 9040. Also, a task condition unit 9050 is expressed by a task condition unit title "Cond-C", and condition contents indicated by the task condition unit title "Cond-C" is expressed by a conditional expression 9060. Here, conditional expressions should be described with reference to the task property of the task to which the event rule belongs, the action state, the subtask state and the character of the task. Here, the action state shows whether or not "ACTION IS NOT YET EXECUTED", "ACTION IS BEING EXECUTED" or "ACTION WAS ALREADY EXECUTED". The subtask state shows whether or not "SUBTASK IS NOT YET COMPLETED" or "SUBTASK IS ALREADY COMPLETED". The task condition unit "Cond-A" is a condition unit which shows the conditions such that the task property "TRAVELING EXPENSES" are more than 0, "CLEAR TRAVELING EXPENSES" task, which is the subtask, is not yet completed or the task property "REPORT File" means a blank " " (null string).

FIG. 10 shows the structure of the execution unit module 10000 and the examples thereof. Here, the execution unit 10010 is expressed by an execution unit tile "Cmds-A", and automatic execution contents that this execution unit 10010 indicate are expressed by an execution command string 10029. In a like manner, an execution command string 10030 is expressed by an execution unit title "Cmds-B", and automatic execution contents are expressed by an execution command string 10040. Here, the execution command string 10020 shows a message "ALTHOUGH BUSINESS TRIP TASK IS FINISHED, THERE STILL REMAINS TASK WHICH IS NOT YET COMPLETED" to the task execution character. Then, the execution command string 10020 generates a subtask for effecting a post-processing of an unfinished action, and shows operation contents in which a day of the end of the month of this execution is substituted into "DEADLINE" which is the task property of the generated task.

Figure 11:
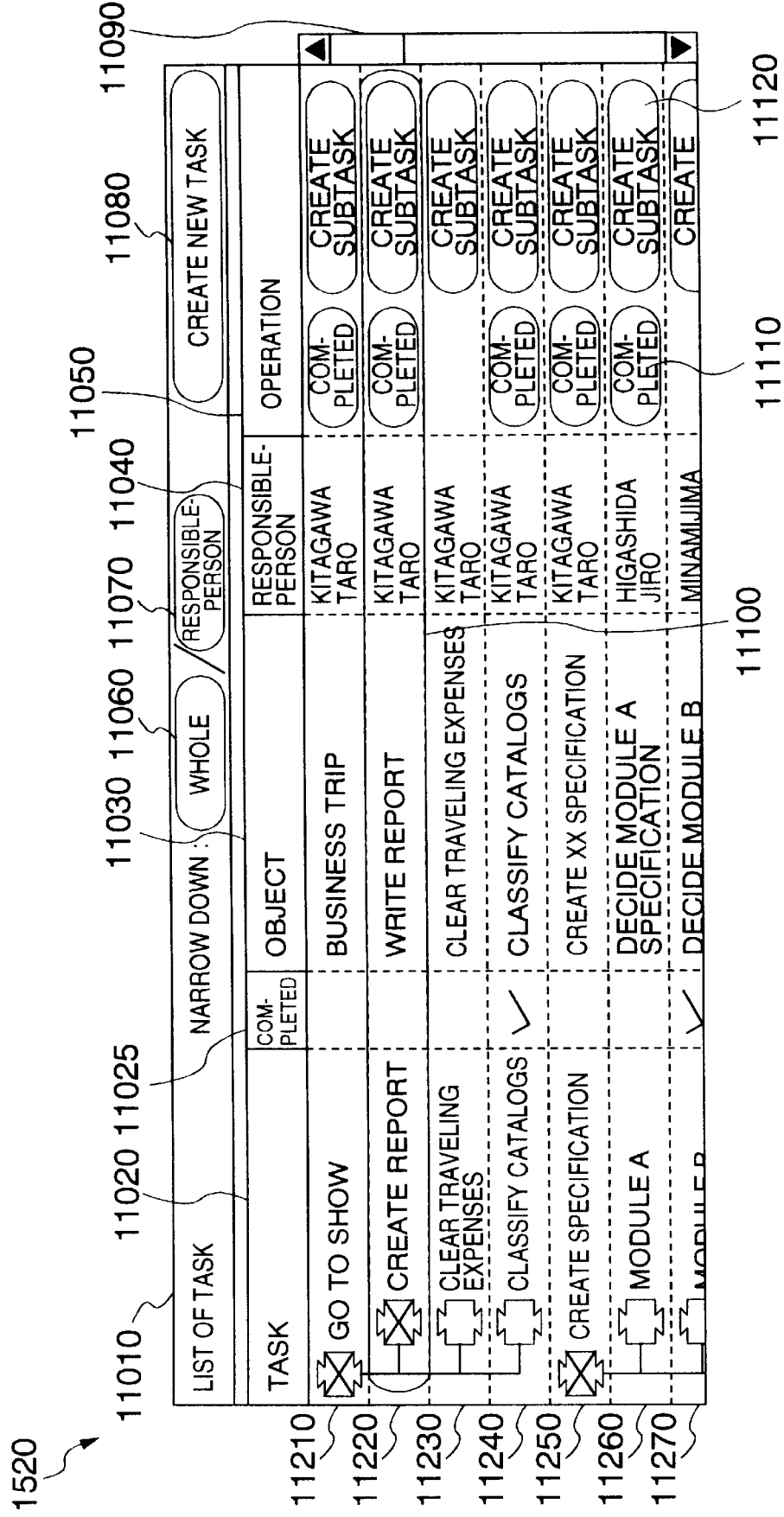
FIG. 11 is a diagram showing a task list display section.

FIG. 11 shows details of the task list display section 1520 according to this embodiment. The function of the task list display section 1520 will be described with reference to FIG. 11. A title display column 11010 displays a title indicating that this display section is the task list display section. Lines 11210 to 11270 express task entries display in this task list display section 1520. Columns 11020, 11025, 11030 and 11040 display thereon a variety of information of respective task entries. The task title column 11020 displays thereon task titles of the task entries expressed by the lines at every line, the icons indicative of the existence of subtask and the tree structure expressing the main task and subtask relation of the tasks.

FIGS. 12A and 12B show icons indicative of respective tasks in the tree structure of the main task and subtask relationship. The icons express two kinds of displays depending upon whether or not the task has the subtask. An icon 12010 in FIG. 12A shows an icon corresponding to the task which has the subtask. An icon 12020 in FIG. 12B shows an icon corresponding to the task which has no subtask. Therefore, it is possible to judge based on the shape of the icon whether or not the task has the subtask. In FIG. 11, based on the shape of the icons, the user can understand that the task "GO TO XX SHOW", the task "CREATE REPORT" and the task "CREATE XX SPECIFICATION" have the subtasks. The line 11210 expresses the task "GO TO XX SHOW", the line 11220 expresses the task "CREATE REPORT", the line 11230 expresses the task "CLEAR TRAVELING EXPENSES" and the line 11240 expresses the task "CLASSIFY CATALOGS". Also, as shown in FIG. 11, the tree structure which has the icon disposed at the left end of the task title list as the node expresses that the task "GO TO XX SHOW" has the task "CREATE REPORT", the task "CLEAR TRAVELING EXPENSES" and the task "CLASSIFY CATALOGS" as the subtasks thereof. Similarly, it can be understood from FIG. 11 that the task "CREATE XX SPECIFICATION" expressed by the line 11260 includes a task "MODULE A" expressed on the line 11260 and a task "MODULE B" expressed on the line 11270 as subtasks.

Further, a task completion check column 11025 indicates whether or not the task entry expressed by each line is completed. Also, a task object column 11030 indicates an object of a task entry expressed by each line, and a task responsible person column 11040 indicates a task execution responsible person expressed by each line. As is clear from FIG. 11, in the task "GO TO XX SHOW" on the line 11210, the object is "BUSINESS TRIP", the task is not yet completed and that the responsible person is "KITAGAWA TARO". Each user can look up this task list.

According to this embodiment, in the task list display section 1520, a subtask of the task and a task of such subtask can be selectively displayed on the task list at every task. Judging from the icon, the reason that the subtack is not included in the task "CREATE REPORT" which should have included a subtask in the task list shown in FIG. 11 is that it is selected that the task "CREATE REPORT" does not include a task following the subtask. In the present invention, the manner in which a certain task includes a subtask or a task following such a subtask in the task list may be selected freely. For example, the selection of such subtask and a task following such subtask may alternately be switched by double-clicking the task icon. Alternatively, the selection of such subtask and a task following such subtask may alternately be switched by clicking the task icon. Moreover, such a selection may be designated not by the mouse 1560 but by the keyboard 1550 or a displayed picture may be designated directly. According to this function, even when there are many tasks to be displayed, subtasks are not displayed so that the user can look around the whole of the main tasks on the task list. Moreover, only the subtasks of the necessary main task are displayed, whereby a target task can be effectively selected from the task list by effectively utilizing the main task and subtask structure of the task.

Buttons 11060 and 11070 are ones for designating the narrowing-down of tasks displayed by the task list. When the button 11060 is designated, all the registered tasks are selected as the object of the task list. When the button 11070 is selected, only tasks that the user is in charge of are selected as the object of the task list.

A button 11080 is a button for designating that a new task entry should be created. FIG. 13 shows one displayed example obtained when the button 11080 is designated. FIG. 13 shows a new task creation operation section 13000 for creating a new task entry. Reference numeral 13010 in FIG. 13 denotes a title display column which displays a title "CREATE NEW TASK" which indicates that this display section is a new task creation operation section. When selected, a task title input section 13020 can enter a character string which becomes a task title. Similarly, when selected, a character input section 13030 can enter a task execution responsible person. When selected, a task object input section 13040 can enter a character string which becomes a task object. Also, a main task title display section 13050 displays thereon "(NULL)" indicating that a task newly created has no main task.

Here, if a creation button 13060 is designated after correct values are entered into the respective input frames of the task title, the responsible person and the task object, then it is possible to create a new task having new values entered from the respective input sections.

The task title column 11020 of each line of the task list display section of FIG. 11 becomes an input section in which a task title of a task entry expressed by that line can be entered if the user selects its display portion. The value of the task title column 11020 can be changed by entering a new value into the input section. Also, when respective display portions of respective lines of an object column 11030 and a responsible person column 11040 are selected, the object column 11030 and the responsible person column 11040 become input sections of these items, in which the task object and the responsible person of the task entry expressed by that line can be changed.

The operation button column 11050 includes a completion button 11110 and a subtask creation button 11120 at every line of the task list display section. However, the line which expresses a task that has already been completed has no completion button. On the line of the completed state, there is displayed only a subtask creation button. When the completion button 11110 is designated, the task entry expressed by such line is placed in the completed state. Also, when the subtask creation button 11120 is designated, a subtask of the task expressed by such line is created newly.

The new task creation operation section 13000 shown in FIG. 13 is displayed not only when the new task creation button 11080 in FIG. 11 is designated but also is displayed when this subtask creation button 11120 shown in FIG. 11 is designated. However, in this case, unlike the case that the new task creation button 11080 is designated, a main task title display section 13050 automatically displays a title of a task expressed by the task list at its line on which the subtask creation button was disposed. In other cases, the main task title display section 13050 is operated similarly to the case that the new task creation button 11080 is designated. Then, by designating a creation button 13060 finally, there is created a subtask of a task expressed by the line on which the original subtask creation button 11120 was disposed.

A scroll bar 11090 shown in FIG. 11 has the following functions. Specifically, when there are many task entries and all of the task entries that should be displayed on the task list display frame cannot be displayed, only several consecutive task entries in the task list are displayed in actual practice. Then, the displayed portion of the task list is displayed can be changed by operating the scroll bar 11090. If the displayed portion of the task list is displayed is continuously changed by using the scroll bar 11090, then it is possible for the user to the see all task entries included in the task list. A task selection cursor 11100 indicates a task which is selected in order to examine more in detail and operate task information in the task list. As shown in FIG. 11, the task indicated by the line 11220 is selected. A task is selected by clicking, for example, a task icon portion. When a new task is selected, a task detail display section 14000 shown in FIG. 14 is displayed, and detailed information selected is displayed in the task detail display section 14000.

Figure 14:
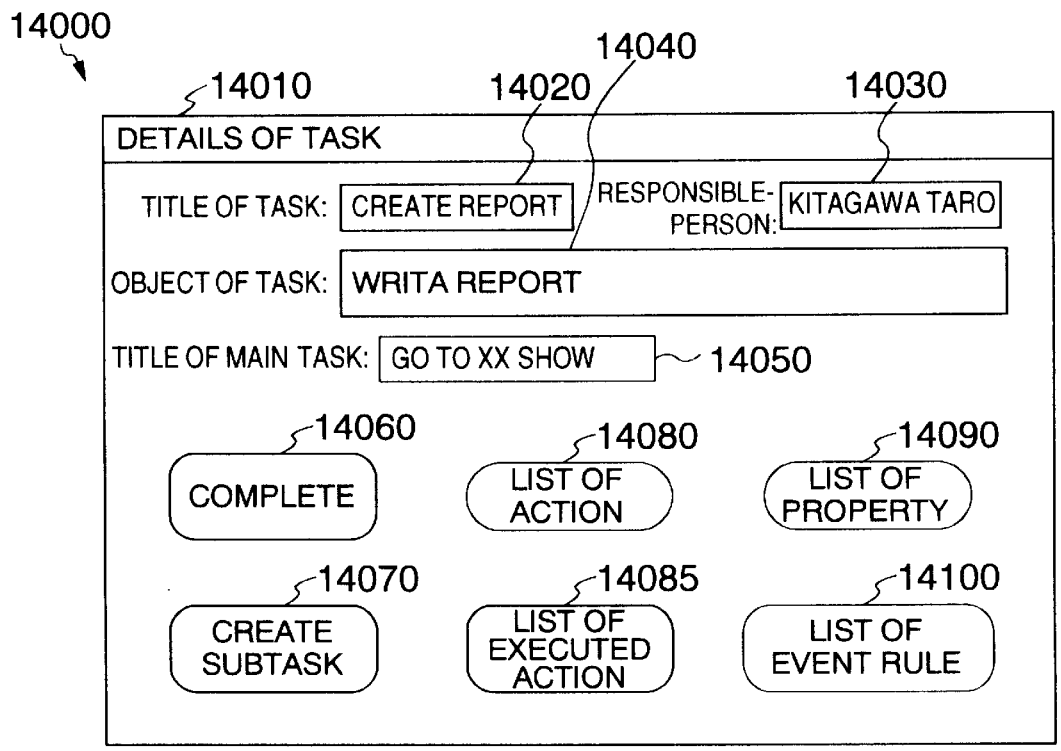
FIG. 14 is a diagram showing a task detail information display section.

FIG. 14 is a diagram showing the task detail information display section 14000 which displays detailed information of the task selected at the task list display section 1520 in FIG. 11. A title display column 14010 which is a title display column displays a title "TASK DETAIL" indicating that this display section is the task detail information display section 14000. A task title display section 14020 displays a task title of the task. If the user selects such title display section 14020, then the user can enter a task title one more time thereby to change a task title. Similarly, a responsible person display section 14030 displays a task execution responsible person of the task. If the user selects such responsible person display section 14030, then the user can enter a task execution responsible person one more time thereby to change the task execution responsible person. Also, a task object display section 14040 displays a target object of the task. If the user selects such task object display section 14040 and enters a task object one more time, then the user can change the task object.

A master title display section 14050 displays a task title of a main task if the selected task has the main task. If the selected task has no main task, then the main task title display section 14050 displays that the selected task has no main task. If the user designates a completion button 14060, then the task is set to the completed state. When the task becomes unnecessary in somewhere of the execution of the task, the user can force the task to be completed by designating this completion button 14060. When the user designates a subtask creation button 14070, the new task creation operation section 13000 shown in FIG. 13 is displayed in order to create the subtask of the task. When the user depresses an action list button 14080, there is displayed a task action list display section which displays a list of the task at its actions which are not yet executed. The task action list display section will be described later on with reference to FIG. 17.

When the user designates an execution action list button 14085, there is displayed an execution action list display section which displays a list of the task at its actions which are still being executed or which have been already executed. The detail of the execution action list display section will be described later on with reference to FIG. 19. When the user designates a property list button 14090, there is displayed a task property list display section which displays a list of task property. The detail of the task property list display section will be described later on with reference to FIG. 15. When the user designates an event rule creation button 14100, there is displayed an event rule list display section which displays a list of event rules of the corresponding task. The detail of the event rule list display section will be described later on with reference to FIG. 20.

Figure 15:
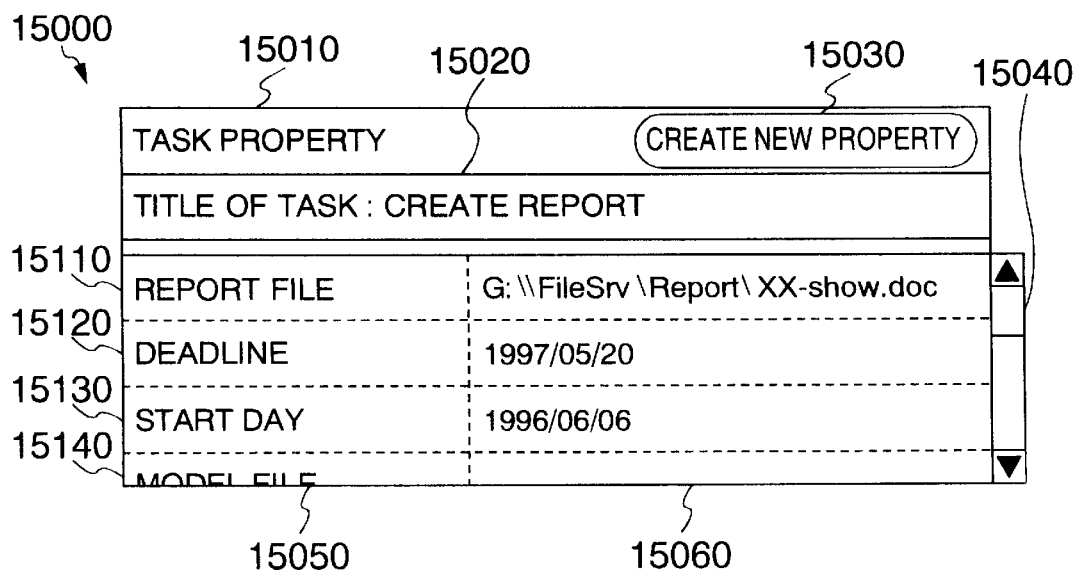
FIG. 15 is a diagram showing a task property list display section.

FIG. 15 shows a task property list display section 15000 which is displayed when the user depresses the task property list button 14090 in the task detail information display section 14000 shown in FIG. 14. A title display column 15010 displays a title "TASK PROPERTY" which indicates that the display section 15000 shown in FIG. 15 is the task property list display section. A task title display section 15020 displays thereon a title of the selected task. When the user selects a new property creation button 15030, there is displayed a property creation operation section. If the user carries out a necessary operation, then the user can create a new property for the selected task. In FIG. 15, lines 15110 to 15140 indicate properties of the selected task. Each of the lines 15110 to 15140 includes a property title column 15050 and a property value column 15060. Here, the property title column 15050 displays a title of a property indicated by each line, and the property value column 15060 displays a value of a property indicated by each line. The property title column 15050 and the property value column 15060 not only display the title of the property and the value of the property but also can be entered if they are selected by the user. Thus, the user can change the title or the value of the corresponding property, respectively.

A scroll bar 15040 has the following functions. Specifically, when there are many task properties so that all of these task properties cannot be displayed on the task property list display frame, there are displayed several consecutive task properties. Then, the user can change a displayed portion of the task property list by operating the scroll bar 15040. If the user changes the displayed portion of the task property list continuously by using the scroll bar 15040, then the user can check all properties of the corresponding task.

Figure 16:
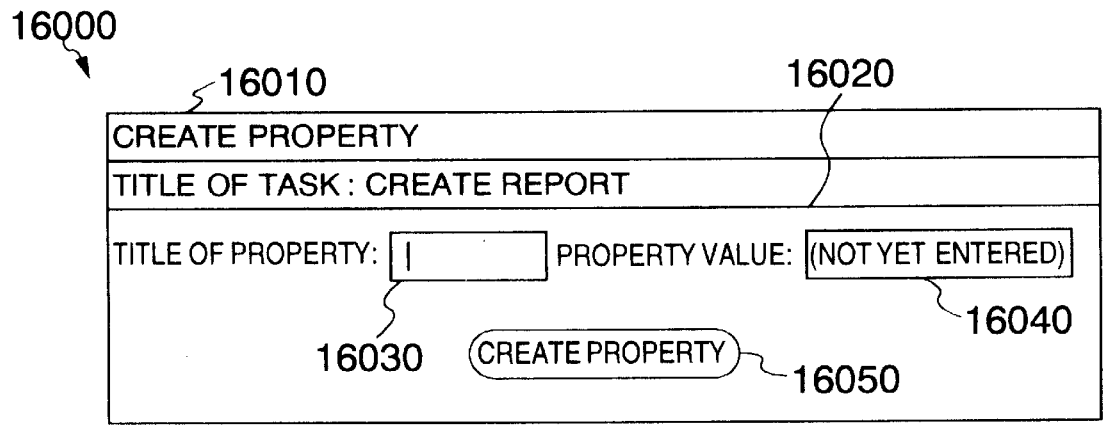
FIG. 16 is a diagram showing a task creation operation section.

FIG. 16 shows a property creation operation section 16000. A title display column 16010 displays thereon a title "CREATE PROPERTY" which indicates that the display section 16000 shown in FIG. 16 is the property creation operation section. On a task title display section 16020, there is displayed a title of a task which becomes a target of the property creation. A title of a property which is to be created newly is entered into a property title input section 16030, and a value of a property which is to be created newly is entered into a property value input section 16040. When the user designates a property creation button 16050 after the property value and the property value are entered into the property title input section 16030 and the property value input section 16040, the property having the entered property title and property value is created on the task which is the target of the property creation operation.

Figure 17:
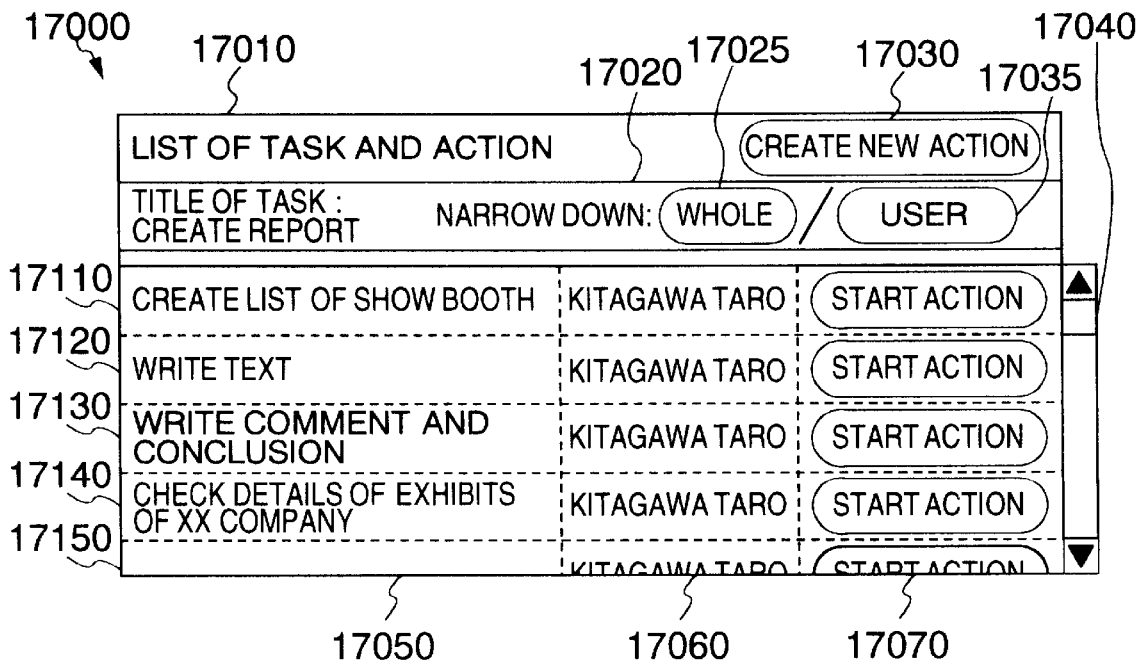
FIG. 17 is a diagram showing a task action list display section.

FIG. 17 is a diagram showing a task action list display section 17000 displayed when the user depresses a task action list button 14080 in the task detail information display section 14000 shown in FIG. 14. This action list displays thereon actions, which are not yet executed, in actions of the corresponding task. On a title display column 17010, there is displayed a title "TASK ACTION" which indicates that the display section shown in FIG. 17 is the task action list display section. A task title display section 17020 displays thereon a title of the selected task. When the user designates a new action creation button 17030, there is displayed an action creation operation section (FIG. 18). Therefore, the user can create a new action for the selected task by executing a necessary operation. Buttons 17025 and 17035 are buttons which are used to designate the restriction of actions displayed on the action list. When the button 17025 is designated, the target of the action list covers the whole of the actions of the corresponding task. When the button 17035 is designated, the target of the task list is limited to the action in which the user is the character in the actions of the corresponding task.

Lines 17110 to 17150 indicate actions of the task which is now selected. Each of the lines 17110 to 17150 includes an action title column 17050, a responsible person column 17060 and an action operation column 17070. The action title column 17050 displays thereon a title of action expressed by each line. The responsible person column 17060 displays thereon a responsible person of action expressed by each line. The action operation column 17070 includes an action start button which places the action of each line in the execution state. The action title column and the responsible person column of each line not only display the title of the action and the responsible person of the action but also they can be entered when they are selected. Thus, the user can change the title or the responsible person of the corresponding action.

A scroll bar 17040 has the following functions. Specifically, when there are many task and actions and all of them cannot be displayed on the task action list display frame, in actual practice, there are displayed several consecutive task actions. Then, the user changes a portion in which the task action list is displayed by operating the scroll bar 17040. The user can check the whole of the actions of the corresponding task by continuously changing the displayed portion of the task action list with the scroll bar 17040.

FIG. 18 is a diagram showing an action creation operation section 18000. On a title display column 18010, there is displayed a title "CREATE ACTION" which indicates that FIG. 18 is the action creation operation section. On a task title display section 18020, there is displayed a title of a task which becomes a target of the action creation. A creation title input section 18030 is a section in which a title of an action which is to be created newly is entered. A responsible person input section 18040 is an section in which a character of an action which is to be created newly is entered. When an action creation button 18050 is designated after the title and the responsible person of the action are entered into these input sections 18030 and 18040, there is created an action which has the inputted action title and responsible person.

FIG. 19 shows an execution action list display section 19000 displayed when the execution action list button 14085 is designated on the task detail information display section 14000 in FIG. 14. A title display column 19010 displays thereon a title "EXECUTE ACTION" which indicates that the display section shown in FIG. 19 is an execution action list display section. On an action title display section 19020, there is displayed a title of the selected action. Lines 19110 to 19150 indicate actions, which are now being executed or which have already been executed, of the selected task. Each of the lines 19110 to 19150 includes an action title column 19030 and an action state column 19040. The action title column 19030 displays a title of an action indicated by each line, and the action state column 19040 displays whether an action indicated by each line is now being executed or has already been executed. An action operation column 19050 includes an action end button 19060 which causes an action to be placed in the executed state when an action indicated by each line is being executed.

A scroll bar 19070 has the following functions. Specifically, when there are many actions to be executed and cannot be all displayed on the execution action list display frame, there are displayed several consecutive execution actions in actual practice. Then, by operating the scroll bar 19070, there is changed the execution action list displayed portion. The user can check all actions by continuously changing the execution action list displayed portion with the scroll bar 19070.

FIG. 20 shows an event rule list display section 20000 displayed when the user designates the event rule list button 14100 in the task detail information display section 14000 in FIG. 14. On a title display column 20010, there is displayed a title "EVENT RULE LIST" which indicates that the display section shown in FIG. 20 is an event rule list display section. A task title display section 20020 displays a title of a target task. When the user designates a new even rule creation button 20030, there is displayed an event rule creation/correction operation section 21000 shown in FIG. 21. Thus, there can be created a new event rule.

As shown in FIG. 20, lines 20110 to 20140 indicate event rules of the task, respectively. Each of the lines 20110 to 20140 includes columns 20040 to 20065, and shows contents of each event rule. An event condition column 20040 displays an event condition of an event rule indicated by each line. While the event condition indicates a point at which an operation is carried out by a certain operation of a certain task object, in this event condition column 20040, such operation is displayed by the three display sections. A first display section is a target task title display section 20070 which displays thereon a title of a task to which there belongs a task object which becomes a target of a task object operation to be expressed. A second display section is a target task object title display section 20080 which displays thereon a title of a task object which becomes a target of a task object operation to be expressed. A third display section is an event type display section 20090 which displays thereon an explanation of an event type.

Here, the user can see the kind of the target task object from the event type. For example, when the event type is "CHANGE PROPERTY", the user can see that the target task object is property. However, when the event type is "COMPLETE TASK", a title of a task which becomes a target of a completion operation is displayed on the target task title display section 20070, and nothing is displayed on the target task object title display section 20080. On a task condition column 20050, there is displayed a task condition portion title of an event rule expressed by each line. On a task condition column 20060, there is displayed an execution portion title of an event rule expressed by each line. An event rule operation column 20065 includes an event rule change button. When the user designates this event rule change button, an event rule creation/correction operation section 21000 shown in FIG. 21 is displayed, and the user can change the contents of event rule.

FIG. 21 shows the event rule creation/correction operation section 21000. The event rule creation/correction operation section 21000 is displayed when the user creates a new event rule by designating a new event rule creation button on the event rule list display section 20000 shown in FIG. 20. Also, the event rule creation/correction operation section 21000 is displayed when the user changes an event rule by designating a change button of each existing event rule. On a title column 21010, there is displayed the title "CREATE/CHANGE EVENT RULE" which indicates that the operation section shown in FIG. 21 is the event rule creation/change operation section. On a task title display section 21020, there is displayed a title of a target task. An event condition display portion 21025 includes three display sections which designate information of a task object operation expressing a certain point as an event condition. A first display section is a target task title display section 21030 on which there is displayed a title of a task to which a target task object of a task object operation to be expressed belongs. A second display section is a target task object title display section 21040 in which there can be displayed a title of a target task object of a task object operation to be expressed. A third display section is an event type display section 21050 on which there can be explained an event type.

On a task condition portion display section 21070, there is displayed a condition expressed by a task property for narrowing a condition required when an event indicated by the event condition portion 21025 of the event rule occurs or is executed. Then, a task condition portion display section 21070 includes a task condition portion title display section 21080 which displays thereon a task condition portion title given to a conditional expression indicating a task condition and a task conditional expression display portion 21090 which displays thereon contents of a conditional expression of a condition portion. In a like manner, an execution portion display section 21100 displays thereon an event rule which is executed when an event indicated by the event condition portion occurs in the corresponding event rule and a task condition shown on the task condition portion is established. Then, an execution portion display section 21000 includes an event rule execution portion title display section 21110 which displays thereon a title given to a task operation command row of the event rule execution portion and a command row display portion 21120 which displays thereon contents of a task operation command row of the event rule execution portion. When this event rule creation/change operation section is displayed in order to change the event rule, values of the even rule that should be changed are displayed on the seven display sections of the target task title display section 21030, the target task object title display section 21040, the event type display section 21050, the task condition portion title display section 21080, the task conditional expression display portion 21090, the event rule execution portion title display section 21110 and the command row display portion 21120.

When the user creates a new event rule, "(NULL)" which means that values are not yet entered are displayed on the above-mentioned seven display sections, respectively. In any cases, when the user selects respective display sections, there can be entered new values. Then, the user can create or change the event rule reflecting the changed value by designating an update button 21060.

An outline of the processing of the task information display/operation unit will be described below. The task information display/operation unit is adapted to obtain task information from the task information management unit and display the thus obtained task information to the user by using the display sections and the operation sections shown in FIGS. 11 through 21. Also, the task information display/operation portion is adapted to change task information in accordance with the task information operation of the user through the task information management unit.

FIG. 22 is a flowchart roughly showing a flow of a processing executed in the task information display/operation unit.

Referring to FIG. 22, and following the start of operation, a user interface for display and operation to and of the user is initialized at a first step 22010. There is also initialized a data communication between the task information display/operation unit and the task information management unit. In the next step 22020, task information necessary for displaying an initial display section is obtained from the task information management unit. In the next step 22030, the initial display section is displayed based on information obtained at the step 22020. The initial display section is the task list display section 1520. In the next step 22040, the user's operation for the display section and the operation section which are displayed at that time is awaited, and when there is the user's operation, information indicative of such user's operation is obtained. Here, the user's operation is "DEPRESS BUTTON" or "SELECT DISPLAY AERA". In the next decision step 22050, it is determined whether or not the user's operation obtained at the step 22040 is the termination of the task information display/change portion. If the user's operation is not the termination operation of the task information display/change portion as represented by a NO at the decision step 22050, then control goes to a step 22060. If the user's operation is the termination operation of the task information display/change portion as represented by a YES at the decision step 22050, then control goes to a step 22070. In the step 22060, a corresponding processing is executed in accordance with the user's operation obtained at the step 22040. For example, when a new display section is displayed, task information for displaying such new display section is obtained from the task information management unit. Also, the operation for the task information such as "CREATE NEW PROPERTY", "FINISH ACTION" or the change of the task object is executed through the task information management unit.

When the step 22060 is ended, control goes to the step 22040, and the steps 22040, 22050 and 22060 are repeated. If the user's operation is the termination operation as represented by a YES at the decision step 22050, then control goes to a step 22070, at which the post-processing of the task information display/operation unit is executed. The post-processing is the termination processing of the data communication between the task information display/operation unit and the task information management unit, the display of the display section and the release of the resource necessary for the operation. When the post-processing is ended, the task information display/operation unit is ended.

An outline of the processing in the task information management unit will be described below. Based on the control (hereinafter referred to as "task command") of the task information display/operation unit and the event rule driver unit, the task information management unit searches task information from the task information memory unit, returns the thus obtained task information to the event rule driver unit, and changes the task information of the task information memory unit.

Figure 23:
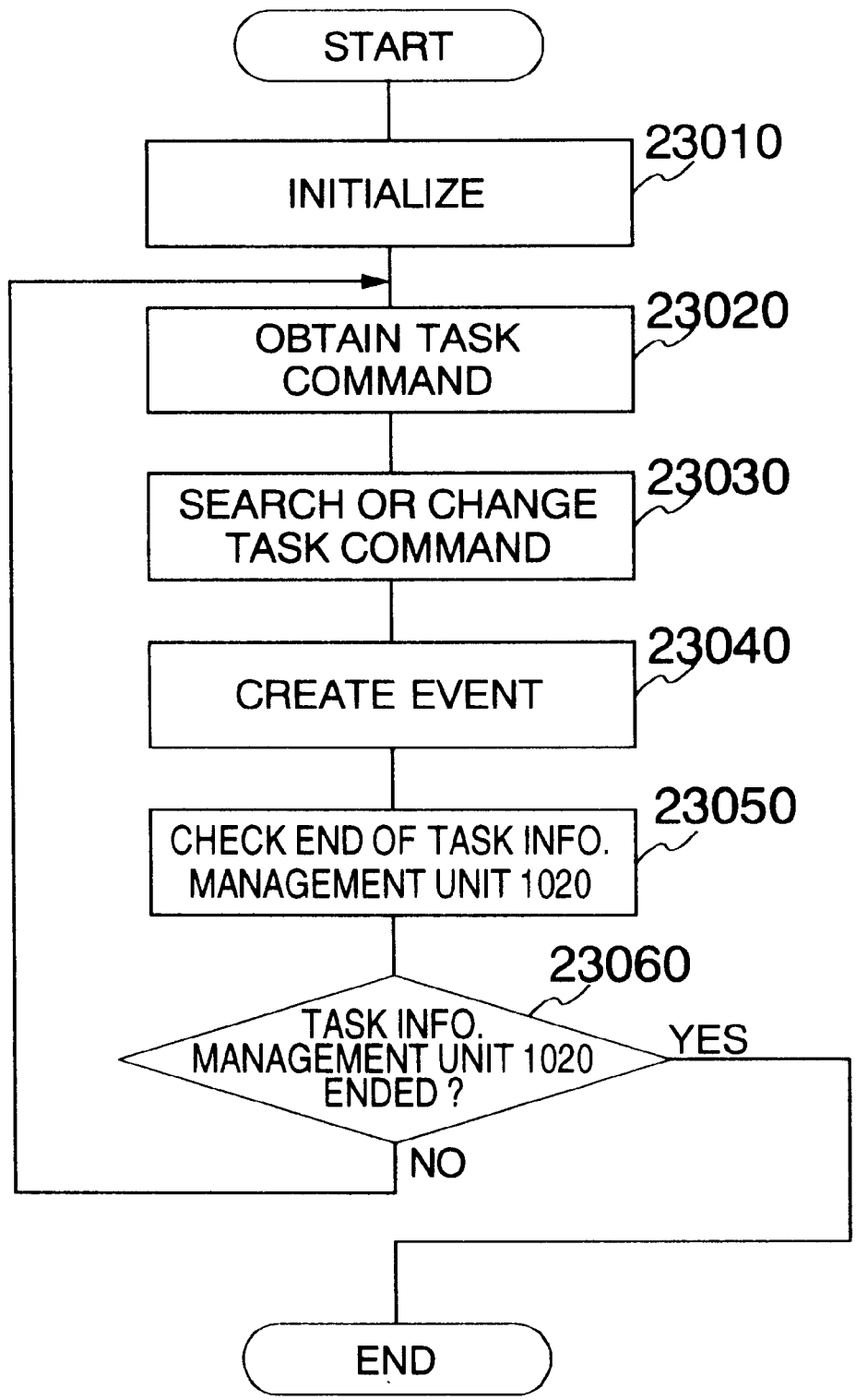
FIG. 23 is a flowchart showing a flow of a processing executed by a task information management unit.

FIG. 23 is a flowchart roughly showing a flow of a processing of the task information management unit.

Referring to FIG. 23, and following the start of operation, initialization for accessing the task information memory unit is executed at a step 23010. In the next step 23020, the existence of a task command from the task information display/operation unit or the event rule driver unit is checked, and the task command is obtained. If there is no task command, then the processing is awaited until the task command is issued. In the next step 23030, the task information management unit searches the task information or changes the task information in accordance with the task command. Also, the task information management unit returns the searched result to a module from which the task command is sent. When the task information management unit changes the task information, the task information management unit changes information concerning the task object such as the change of the task entry by rewriting the contents of the table in accordance with the changed contents. Also, when the task information management unit creates a new task object, the task information management unit creates a record of a corresponding table. Moreover, when the task is completed and the action is started or ended, a completion check field of each task entry table or an execution state field of an action entry table are changed to the corresponding states.

In the next step 23040, when the task command changes the task information, the task information management unit creates an event indicative of the changed content and sends the thus created event to an event cue which is managed by the event rule driver unit 1040. In the next step 23050, it is checked that the task information management unit 1020 should be terminated. In the next decision step 23060, it is determined based on the checked result at the step 23050 whether or not the task information management unit 1020 is terminated. If the task information management unit 1020 is terminated as represented by a YES at the decision step 23060, then control is ended. If the task information management unit 1020 need not be terminated by a NO at the decision step 23060, then control goes back to the step 23020, whereat the evaluation of the task command is continued.

Figure 24:
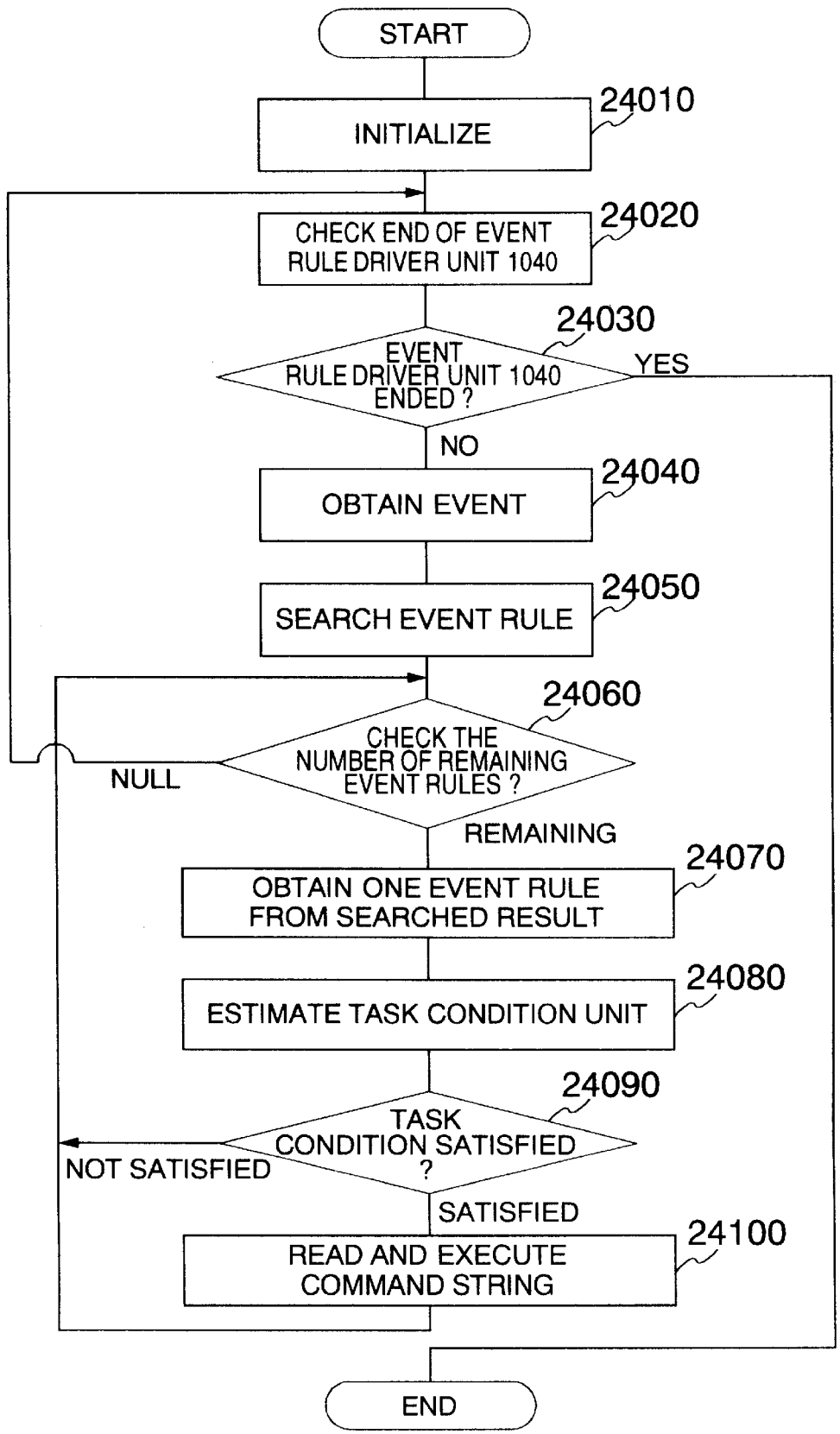
FIG. 24 is a flowchart showing a flow of a processing executed by an event rule driver unit.

An outline of the event rule driver unit 1040 will be described next. The event rule driver unit 1040 automatically changes task information in accordance with the event rule stored in the task information memory unit 1010 on the basis of the event information from the task information management unit 1020. FIG. 24 is a flowchart roughly showing a flow of a processing in the event rule driver unit 1040.

Referring to FIG. 24, and following the start of operation, there is executed an initialization for exchanging data between the event rule driver unit 1040 and the task information management unit 1020 at a step 24010. At the next step 24020, it is checked that the event rule driver unit 1040 should be terminated. In the next decision step 24030, it is determined on the basis of the checked result at the step 24020 whether or not the event rule driver unit 1040 is terminated. If the event rule driver unit 1040 is terminated as represented by a YES at the decision step 24030, then control is ended. If the event rule driver unit 1040 is not terminated as represented by a NO at the decision step 24030, then control goes to the next step 24040. In the step 24040, one event generated from the task information management unit 1020 is obtained from the event queue. In a step 24050, an event rule having an event condition with which the event obtained at the step 24040 is matched is searched, and a result thereof is held as a searched result. In the next decision step 24060, it is determined whether or not there remains the event rule in the searched result. If there remains no event rule at the decision step 24060, then control goes back to the step 24020. If on the other hand there remains an event rule, then control goes to a step 24070, at which one event rule is obtained from the searched results and the following processing is executed. In the next step 24080, the task condition portion of the event rule obtained at the step 24070 is read out and the evaluated. At that time, the task property, etc. used in describing the condition are obtained from the task information management unit 1020. In the next decision step 24090, it is determined based on the result obtained at the step 24080 whether or not the condition satisfies the task condition. If the condition does not satisfy the task condition at the decision step 24090, then control goes back to the step 24060. If the condition satisfies the task condition at the decision step 24090, then control goes to the next step 24100. In the step 24100, the execution portion of the event rule obtained at the step 24070 is read out and its command row is executed. When this command row is executed, the task information management unit 1020 is accessed and used.

According to the above-mentioned arrangement, the user need not define and register the action and the action procedure by the network-type flow such as a conventional workflow system before starting the task. But instead, when the task is started, the user may create the task entry, and may register the action and the action procedure determined at that time by creating the action entry and the event rule. If the user may register these action entry and event rule, then the user who engages in these actions may easily search the user's own work. Moreover, after the task is started and makes progress to a certain degree, each user can add or change the action and the action procedure, if necessary. As a result, even the task which is determined by information such as the action and the action procedure used to support the task in accordance with the execution of the task can be used as a target of the task execution support.

Also, when the task is created, the task can be hierarchized by the main task and subtask structure in accordance with the objects between the tasks. When the user searches the task, the user can search the necessary task based on such main task and subtask structure. Moreover, the user can manage the task execution character information at every task, whereby the user can narrow and display the task. Thus, there is then the effect such that, even when the action in the task is not always registered, the user can effectively search and select the necessary task entry.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A task execution support system for supporting the execution of at least one task including a plurality of actions, comprising:

a server machine which memorizes and manages information concerning said task and action;

at least one client machine which enters, outputs and changes information concerning said task and action; and a channel which connects said server machine and said client machine, wherein said at least one client machine can access information concerning said task or action from said server machine, said at least one client machine creates an event rule including an event occurrence point condition expressed by a combination of a title of said task or action and a state transition, an event start condition expressed by a combination of states of said task or action at said event occurrence point and an event execution content expressed by a combination of operations in said task or action with reference to information concerning said task or action memorized in said server machine, said server machine receives and memorizes a plurality of event rules from said at least one client machine through said channel and completes the execution of said task by executing said task in accordance with said plurality of event rules, and wherein said at least one client machine is one of a plurality of client machines handled by users, and each of said users creates said event rules by using a client machine with reference to information concerning said task and action memorized in said server machine.

2. A task execution support system as claimed in claim 1, wherein said state transition in said event occurrence point condition includes the state and completion of said task, each start and completion of said action and the change of property information of said task.

3. A task execution support system as claimed in claim 1, wherein said state transition in said event start condition includes the property of said task, the state of said action and a responsible person of said task.

4. A task execution support system as claimed in claim 1, wherein said event execution contents include the completion of said task, the state and completion of said action, the change of the property of said task, the change of the responsible person of said task and action and the creation of new task and action.

5. A task execution support system according to claim 1, further comprising subtasks hierarchized in a main task and subtask relationship relative to said task.

6. A method of supporting the execution of at least one task including a plurality of actions, comprising the steps of:

accessing, by at least one client machine, information concerning a task or action from a server machine;

creating by said at least one client machine, an event rule including an event occurrence point condition expressed by a combination of a title of said task or action and a state transition, an event start condition expressed by a combination of states of said task or action at said event occurrence point, and an event execution content expressed by a combination of operations in said task or action with reference to information concerning said task or action memorized in said server machine;

receiving and memorizing, in said server machine, a plurality of event rules from said at least one client machine through a channel; and completing execution of said task, in said server machine, by executing said task in accordance with said plurality of event rules, wherein said at least one client machine is one of a plurality of client machines handled by users, and each of said users creates said event rules by using a client machine with reference to information concerning said task and action memorized in said server machine.

7. A method as claimed in claim 6, wherein said state transition in said event occurrence point condition includes the state and completion of said task, each start and completion of said action and the change of property information of said task.

8. A method as claimed in claim 6, wherein said state transition in said event start condition includes the property of said task, the state of said action and a responsible person of said task.

9. A method as claimed in claim 6, wherein said event execution contents include the completion of said task, the state and the completion of said action, the change of the property of said task, the change of the responsible person of said task and action and the creation of new task and action.

10. A method according to claim 6, further comprising the step of:

hierarchically ordering subtasks in a main task according to subtask relationships relative to said task.

* * * * *